Oct. 6, 1931.  W. C. McCOY  1,825,750

PISTON

Filed Oct. 25, 1926

Inventor.
William C. McCoy
by Evans & McCoy
Attorneys.

Patented Oct. 6, 1931

1,825,750

UNITED STATES PATENT OFFICE

WILLIAM C. McCOY, OF SHAKER HEIGHTS, OHIO, ASSIGNOR TO THE CLEVELAND TRUST COMPANY, OF CLEVELAND, OHIO, A CORPORATION OF OHIO

PISTON

Application filed October 25, 1926. Serial No. 143,879.

This invention relates to pistons for internal combustion engines and particularly to composite pistons embodying metals of different thermal expansibility.

Pistons have heretofore been proposed in which a highly expansible skirt of aluminum alloy is supported from the head by spaced steel plates that were connected to the edge portions of the working faces of the piston skirt. Other pistons have heretofore been proposed in which the working faces of the skirt were connected over their entire width to an endless steel supporting element carried by the bosses.

In accordance with this invention, I provide a piston wherein the skirt is circumferentially compressible and is supported solely from the central zone of its working face by struts or connectors of relatively low expansibility extending transversely to the wrist pin bosses.

One of the objects of the invention is to provide a support for a highly expansible skirt element that shall be of substantially the same resulting diametral expansibility as the cylinder walls.

Another object of the invention is to transmit the side thrust component of the explosive force directly from the wrist pin bosses to the central zone of the working faces of a piston wherein the opposed working faces are yieldingly connected and their relative positions determined by the thrust transmitting elements.

An additional object of the invention is to provide a piston wherein the working faces of the skirt may be formed of bearing metal or other desired material without regard to the thermal coefficient of expansion of said material, and in which the head may be formed of aluminum alloy or other desirable material.

Another object of the invention is to apply the piston rod side thrust component of driving force directly to the center of the arc of the skirt to insure wide angle bearing contact between the working faces of the piston and the cylinder walls.

Other objects and advantages to be derived from practicing the invention will be apparent to those skilled in the art after a consideration of the embodiments of the invention shown in the accompanying drawings wherein.

Figure 1:
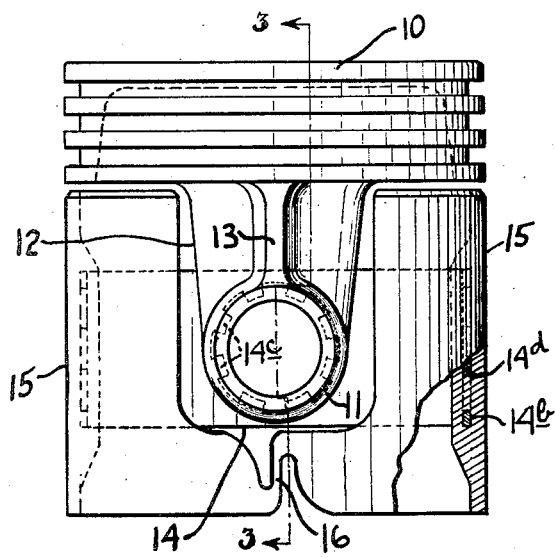
Figure 1 is a side elevational view, looking in the direction of the wrist pin axis, of a piston constructed in accordance with this invention.
Figure 3:
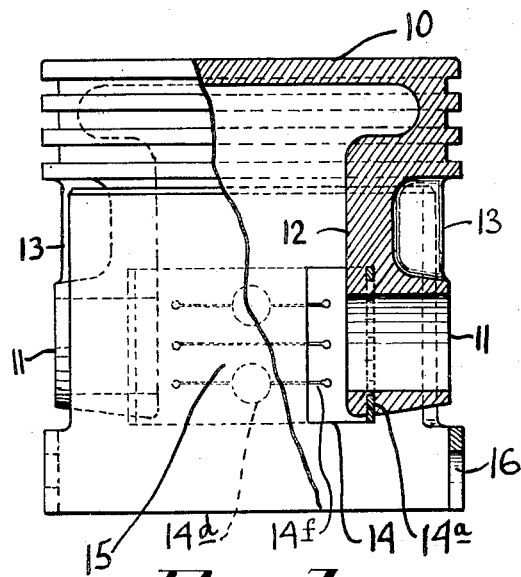
Fig. 3 is an end plan view of the piston looking into the open end of the skirt.
Figure 2:
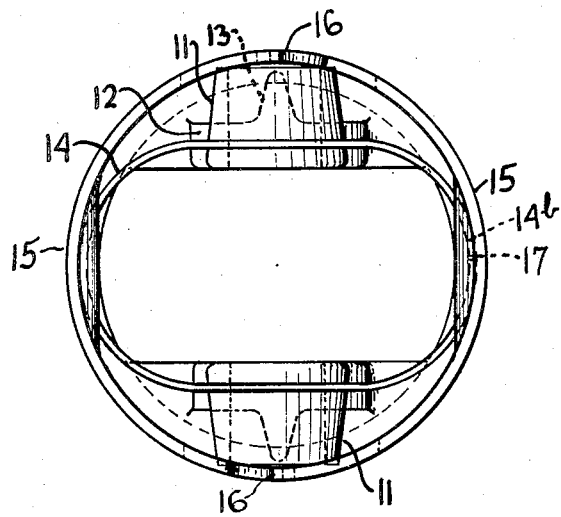
Fig. 2 is a side elevation view of the piston shown in Fig. 1, looking in a direction transverse to the wrist pin axis.

The piston shown in Fig. 1, Fig. 2 and Fig. 3 of the accompanying drawings comprises a head 10 that has a pair of wrist pin bosses 11 integrally connected thereto by webs 12 and 13. The skirt of the piston is entirely separated from the head and is preferably carried solely from a supporting member 14 of substantially the same diametrical expansible qualities as the engine cylinders. The skirt support 14 has opposed portions 14a that are respectively embedded securely within the metal of the boss elements 11 in order that a secure and permanently reliable connection may be obtained between the boss elements and the supporting member 14 that constitutes the sole support for the opposed working faces 15 of the skirt. The metal of the walls of the working faces 15 of the skirt surrounds and embeds the corresponding opposed portions 14b of the connector to thereby provide a secure connection between the supporting member 14 and each of the working faces of the skirt.

The surfaces of the embedded portions of the skirt support 14 are suitably roughened in order to obtain a secure union between the connector and the bosses. The portions 14a are cut away for the wrist pin openings through the boss and are provided with serrated edges 14c that assist in providing a secure union between the supporting member 14 and the bosses 11.

The portions 14b of the connector are also provided with suitable apertures 14d in order to insure a secure union between the skirt and the support.

The skirt support 14 is so positioned that it will, in general, operate at a materially cooler temperature than the wrist pin bosses because such heat as it receives is transmitted from the bosses and also because the continuous bath of oil that is sprayed over the connector tends to maintain it at a relatively cool operating temperature. The material of the support preferably has a coefficient of thermal expansion somewhat larger than the coefficient of expansion of the material of the cylinder wall and of such value that the diametrical separation of the working faces of the piston will be substantially the same as the expansion of the engine cylinder.

The temperature coefficient of expansion of the material chosen for the skirt support 14 should be about the same or even somewhat higher than the coefficient of expansion of the cylinder in order that the piston clearance may be maintained about the same at all temperatures. In starting a cold motor, the connector will be maintained relatively cool by the cool engine oil and this will prevent expansion of the piston before the cylinder walls heat sufficiently to also expand. This relation of the parts insures snug fit of the pistons at all times. Various metal alloys can be used for the construction of this support. Different characters of steels and iron alloys are particularly serviceable in this connection. Although the coefficient of expansion of the connector is preferably at least as great as the coefficient of expansion of the cylinder, the coefficient of expansion should be less than the coefficient of expansion of the head which is preferably formed of aluminum alloy.

The working faces 15 of the skirt are connected by a flexible tongue 16 that is sufficiently yielding to compensate for the difference in the rate of expansion of the skirt and the support 14. Any suitable expansion element may be used but I prefer that the expansion element be incorporated in the piston as originally cast in order that the relatively high internal stresses that would otherwise be set up in the structure by reason of the unequal contraction of the composite parts after casting may be avoided. By forming the flexible element during the casting of the piston, the internal stresses within the piston body relieve themselves.

The supporting element 14 may be formed from a suitable strip of material that is cut to suitable length and has its ends abutted as at 17, or it may be formed as an endless band from a short section of metal tubing.

The supporting element 14 provides a pair of spaced struts that respectively connect the wrist pin bosses with each working portion of the skirt.

A piston of the character proposed could readily be formed by mounting the skirt supporting element 14 on the piston core before casting the piston and then casting the remainder of the piston about the support.

Figure 4:
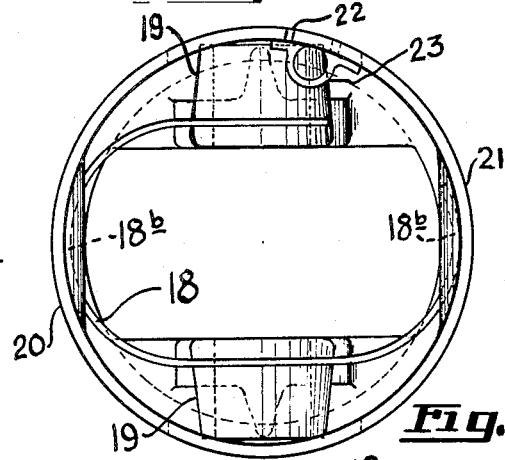
Fig. 4 is a plan view of the open end of a piston of modified form showing a different application of the invention.
Figure 5:
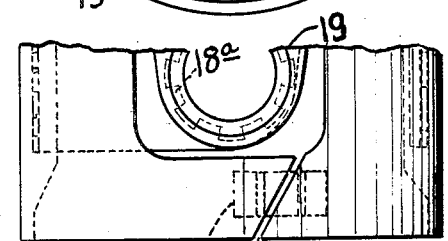
Fig. 5 is a fragmentary side elevational view of the piston shown in Fig. 4.

Fig. 4 and Fig. 5 show a modified application of the invention wherein the skirt supporting member 18 that has portions 18a embedded in the boss elements 19 and portions 18b embedded in the walls 20 and 21 of the opposed working faces of the piston skirt.

Both the skirt and supporting element 18 are made circumferentially yielding in one quadrant of the piston. The supporting element 18 has its ends spaced and respectively embedded in the side wall of the working face 21 of the skirt whereas the other end of the support is embedded in the adjacent wrist pin boss 19. The skirt is also made circumferentially compressible by providing a longitudinal slit 22 that is formed with or without the flexible bridge 23 that spans the slit on the inner side wall of the skirt. The slit in the skirt is preferably formed in the quadrant of the piston wherein the opposed ends of the connector 18 terminate in order to provide a piston wherein the skirt is circumferentially compressible from cylinder wall pressure as well as responsive to the controlled thermal expansion of the skirt support.

One of the struts thus formed by the element 18 connects both oppositely positioned working faces of the skirt with one of the wrist pin bosses whereas the other strut connects the other wrist pin boss with only one of the working faces of the skirt.

The element 18 is inherently laterally flexible to sufficient degree to permit flexing of the piston skirt from cylinder wall pressure.

The relative position of the oppositely disposed working faces of the piston structure shown in Fig. 1, Fig. 2 and Fig. 3 is controlled entirely by the diametric expansibility of the support 14, whereas the relative position of the working faces of the piston structure shown in Fig. 4 and Fig. 5, although primarily controlled by the skirt support, is also controlled by the cylinder pressure. The increased utility of a structure of this character will be apparent.

Although I have shown only two embodiments of the invention in detail, other embodiments of the invention will be apparent to those skilled in the art and I desire, therefore, that the scope of the invention be limited only by the prior art.

What I claim is:

1. In a piston, a head, wrist pin bosses, a separate sectional skirt of aluminum alloy, and a steel strut extending transversely of each of the piston pin bosses across the interior of the skirt and uniting the sections to each other and to the head, said strut having its opposite ends buried in the lateral central zone of the respective skirt sections.

2. In a piston, a head, wrist pin bosses, a separate sectional skirt of aluminum alloy, and a steel strut extending transversely of each of the piston pin bosses across the interior of the skirt and uniting the sections to each other and to the head, said strut having its opposite ends buried in the lateral and longitudinal central zone of the respective skirt sections.

3. In a piston, a head, a pair of wrist pin bosses, a separate skirt of material having a relatively high coefficient of thermal expansion, and a transverse strut of lesser expansible material having a portion arranged transversely of each wrist pin boss and rigidly connected therewith inwardly of the skirt, said strut connecting opposite lateral and longitudinal central zones of the opposite sides of the skirt, substantially as set forth.

4. In a piston, a head, wrist pin bosses, a separate skirt of material having a high coefficient of thermal expansion and provided with oppositely disposed working faces, and transverse struts of less expansible material extending across the interior of the skirt to limit expansion of the skirt in a direction transverse to the piston pin and connected to the inner side wall of the working faces substantially at the lateral and longitudinal center of each working face.

5. A piston having a head, wrist pin bosses integral with the head, a skirt having a circular portion below the piston pin bosses provided with circumferentially yieldingly related parts and upward extensions at the sides between said bosses, and struts of material having a relatively low co-efficient of expansion uniting the pin bosses to the lateral centrol zone of the upward extensions of the skirt, the connection of said struts to the upward extensions of the skirt being well within the lateral marginal edge portions of said extensions.

6. A piston having a skirt with spaced upward extensions at opposite sides thereof, a head with integral piston pin bosses between said extensions, and struts of lesser thermally expansible material respectively connecting said bosses to the central zone of each of said extensions, substantially as set forth.

7. A piston having a skirt with spaced upward extensions at opposite sides thereof, said upward extensions being connected by a portion of the skirt having yieldingly related portions a head with integral piston pin bosses between said extensions, and a single piece member forming spaced struts connecting each of said bosses to both of said extensions, said struts having edges buried in the material of adjacent parts, substantially as set forth.

8. A piston comprising a head, wrist pin bosses integral therewith, a skirt having oppositely positioned cylinder bearing portions, and an endless member solely connecting the bosses with the cylinder bearing portions of the skirt, portions of said member extending laterally across each boss inwardly of the skirt, to thereby respectively connect each boss with the central zone of each cylinder bearing portion of the skirt.

9. A piston comprising a head, wrist pin bosses integral therewith, a skirt having oppositely positioned cylinder bearing portions yieldingly connected by portions underlying each wrist pin boss, a single piece member solely supporting said skirt portions and of different material than the material of the head, said single piece member being attached to said bosses and having a portion embedded in the wall of each of the cylinder bearing portions of the skirt.

10. A piston having a head, piston pin bosses integral with the head, a skirt having a circular portion below the pin bosses provided with yieldingly related portions below each boss and upward extensions at the sides between said bosses, and a member of material having a relatively low coefficient of thermal expansion uniting each of the pin bosses with the lateral central zone of each of the upward extensions of the skirt, whereby the lateral edge zones of the upward extensions of the skirt are yieldingly related to the remainder of the piston structure.

11. A piston for an internal combustion engine comprising a head, wrist pin bosses connected thereto, a circumferentially compressible skirt, and an endless skirt connector having portions rigidly secured to the wrist pin bosses and the central zone of each working face of the piston skirt, said skirt being rendered circumferentially compressible by providing yieldingly related portions in the zone of the skirt underlying each boss.

12. A piston for an internal combustion engine comprising a head, wrist pin bosses connected thereto, a circumferentially compressible skirt, and an endless skirt connector having portions embedded in and rigidly secured to the wrist pin bosses and the central zone of each working face of the piston skirt, said skirt being rendered circumferentially compressible by providing yieldingly related portions in the zone of the skirt underlying each boss.

13. A piston for an internal combustion engine having an engine cylinder comprising a head of aluminum alloy, boss elements integrally formed with the head, a skirt of suitable bearing metal that is entirely separated from the head, and a skirt supporting element formed of material having a higher temperature coefficient than the cylinder wall and a lesser temperature coefficient than the material of the head.

In testimony whereof I affix my signature.

WILLIAM C. McCOY.